United States Patent
Ishida et al.

(10) Patent No.: US 7,322,610 B2
(45) Date of Patent: Jan. 29, 2008

(54) STEERING COLUMN DEVICE FOR VEHICLE AND METHOD OF MANUFACTURING THE DEVICE

(75) Inventors: Ryuuichi Ishida, Gunma-ken (JP);
Toshimichi Takano, Gunma-ken (JP);
Masaki Tomaru, Gunma-ken (JP)

(73) Assignee: NSK Ltd., Tokyo (JP)

( * ) Notice: Subject to any disclaimer, the term of this patent is extended or adjusted under 35 U.S.C. 154(b) by 252 days.

(21) Appl. No.: 10/511,543

(22) PCT Filed: May 13, 2003

(86) PCT No.: PCT/JP03/05942

§ 371 (c)(1),
(2), (4) Date: Oct. 18, 2004

(87) PCT Pub. No.: WO03/095285

PCT Pub. Date: Nov. 20, 2003

(65) Prior Publication Data

US 2005/0173913 A1    Aug. 11, 2005

(30) Foreign Application Priority Data

May 14, 2002  (JP)  .............................. 2002-138807
May 17, 2002  (JP)  .............................. 2002-143412

(51) Int. Cl.
  *B62D 1/16*  (2006.01)
  *B62D 1/18*  (2006.01)
(52) U.S. Cl. .......................... 280/779; 74/492; 74/493; 280/775

(58) Field of Classification Search ................ 280/775, 280/779; 74/492, 493
See application file for complete search history.

(56) References Cited

U.S. PATENT DOCUMENTS

| 5,286,056 A | 2/1994 | Speich |
| 5,452,917 A | 9/1995 | Fujiu et al. |
| 5,802,221 A | 9/1998 | Lüthi et al. |
| 6,591,576 B1 * | 7/2003 | Iida et al. ................. 52/731.6 |
| 2004/0108704 A1 * | 6/2004 | Shibayama ................. 280/775 |

FOREIGN PATENT DOCUMENTS

| DE | 199 62 494 A1 | 7/2000 |
| EP | 0 816 204 A | 1/1998 |
| GB | 2 365 826 A | 2/2002 |
| JP | 7-186975 | 7/1995 |
| JP | 8-67257 | 3/1996 |
| JP | 10-67336 A | 3/1998 |
| JP | 2001-58573 | 3/2001 |
| JP | 2002-308111 | 10/2002 |

* cited by examiner

*Primary Examiner*—Paul N. Dickson
*Assistant Examiner*—Joseph Rocca
(74) *Attorney, Agent, or Firm*—Miles & Stockbridge PC

(57) ABSTRACT

In a manufacturing method of a steering column apparatus for a car in which a column-side bracket attached to a steering column is brought into pressure contact with a body-side bracket attached onto the body of the car to be retained, the body-side bracket or the column-side bracket is comprised of a plurality of divided components in advance, and these plurality of divided components are connected to each other by caulking at the time of assembling, so as to assemble the body-side bracket or the column-side bracket.

3 Claims, 10 Drawing Sheets

STEERING COLUMN DEVICE FOR VEHICLE AND METHOD OF MANUFACTURING THE DEVICE

TECHNICAL FIELD

The present invention relates to a steering column apparatus for a car and a method of manufacturing the same.

BACKGROUND ART

When a car has a collision, the driver may collide with the steering wheel secondarily due to inertia. Thus, in order to protect drivers, a shock absorbing steering column apparatus has been widely employed.

In a shock absorbing steering column apparatus, when the driver has a secondary collision and the energy of the shock of the collision works from the rear part to the front part of the car, the steering column is disconnected from the car body to move to the front part of the car while being collapsed, and absorbs the shock energy meanwhile.

Generally, the steering column is supported and secured to the car body at two positions, that is, at an upper bracket in the rear part of the car and a lower bracket in the front part of the car.

The upper bracket in the rear part of the car of the steering column is provided with the shock absorbing mechanism described above. There is also provided a lock mechanism, etc., for tilt position adjustment and telescopic position adjustment.

On the other hand, the lower bracket in the front part of the car is provided with a supporting pin serving as the center of tilting movement so as to move the steering column in an inclined manner at the time of an operation for tilt position adjustment or telescopic position adjustment. At the same time, such a structure is also employed as smoothly disconnecting the steering column from the lower bracket when the steering column is collapsed to move to the front part of the car at the time of the secondary collision described above so as to securely guide the steering column to the front part of the car without dropping it downward. There is also a scheme for adjusting a telescopic position with an elongated hole which is provided on the lower bracket.

Incidentally, the upper bracket and the lower bracket described above are conventionally punched from one plate, and are manufactured through several steps.

However, since a blank is conventionally formed of one plate and bent several times repeatedly, it is inevitably necessary to bent the blank several times when a closed cross section is required. It is also necessary to weld the edges in alignment when more strength is required.

An area of the blank is required to be large for the bending process, so that a larger amount of metal is required than that actually used, and the fractional end portions are to be discarded. As a result, attention should be given to preparation of the blank in order to save waste to the utmost.

DISCLOSURE OF THE INVENTION

The present invention has been contrived taking the circumstances described above into consideration, and an object thereof is to provide a method of manufacturing a steering column apparatus for a car, in which the number of bending operations and the number of processing steps are reduced, generation of fractional material is avoided to the utmost, and parts to be welded are reduced or made unnecessary.

In order to achieve the above object, according to a first aspect of the present invention, there is provided a manufacturing method of a steering column for a car in which a steering column is supported and secured on the car body through a bracket, comprising the steps of:

forming in advance the bracket of a plurality of divided components, and connecting these plurality of divided components by caulking at the time of assembling, so as to assemble the bracket.

In the manufacturing method of a steering column according to the first aspect of the present invention, the divided components preferably include a main body component which integrally comprises two side portions extending in parallel to the axis of the steering column with the steering column passing therebetween, a connection portion connecting the side portions to each other and two flange portions extending outwardly from the upper ends of the side portions, and a separate component which, if integrally formed with the main body component, would have a complicatedly developed form and assembling step and have a form protruding from the side portions; the side portions of the main body component and the divided components are provided with engagement portions to be engaged with each other; and the engagement portions are caulked and secured to constitute the bracket.

As described above, according to the present invention, a bracket (for example, the upper bracket) is formed not by bending one metallic plate, but preparing in advance a plurality of divided components, and connecting these plurality of divided components to each other by caulking engagement portions which have been respectively processed. Thus, the processing can be easily performed, the number of bending operations and that of the processing steps can be reduced, and resultantly, the manufacturing cost can be reduced.

Since the bracket is formed of the several divided components, an area of a blank can be small, so that an waste fractional material can be reduced to the minimum.

Further, since the caulking process is employed, no gas is produced which is produced when welding is performed, so that the environment can be protected. In addition, since there arises no influence such as deformation caused by the welding heat, the bracket can be manufactured stably.

Further, for the welding step, it is required to manage welding conditions or to perform inspection for confirming the conditions. However, in the caulking step, it can be clearly judged whether the components have been caulked or not. As a result, a problem of non-connection which can not be judged apparently can be avoided.

According to a second aspect of the present invention, there is provided a manufacturing method of a steering column apparatus for a car in which a column-side bracket attached to a steering column is brought into pressure contact with a body-side bracket attached onto the body of the car to be retained, characterized in that:

the column-side bracket is comprised of divided components including a main body portion which consists of a column supporting portion directly in contact with a lower part of the steering column and secured to the lower part and two side plate portions integrally formed with the column supporting portion and in pressure contact with the inner surfaces of the both side plate portions of the body-side bracket, and a fit plate portion which is formed separately from the main body portion for coupling the side plate portions of the main body portion to each other; and the main body portion and the fit plate portion are connected to each other by caulking at the time of assembling, thereby assembling the column-side bracket.

According to a third aspect of the present invention, there is provided a steering column apparatus for a car comprising a body-side bracket attached to the body of the car and retaining a column-side bracket attached to the steering column by bringing the column-side bracket into pressure contact with two side plate portions between which the steering column is located and which extend in parallel to the axis of the steering column characterized in that:

the column-side bracket is comprised of a main body portion which consists of a column supporting portion directly in contact with a lower part of the steering column and secured to the lower part and two side plate portions integrally formed with the column supporting portion and in pressure contact with the inner surfaces of the both side plate portions of body-side bracket, and a fit plate portion which is formed separately from the main body portion for coupling the side plate portions of the main body portion to each other; and the main body portion and the fit plate portion are connected to each other by caulking.

DETAILED DESCRIPTION OF THE EMBODIMENTS

A shock absorbing steering column apparatus according to an embodiment of the present invention will be described below with reference to drawings.

Figure 1:
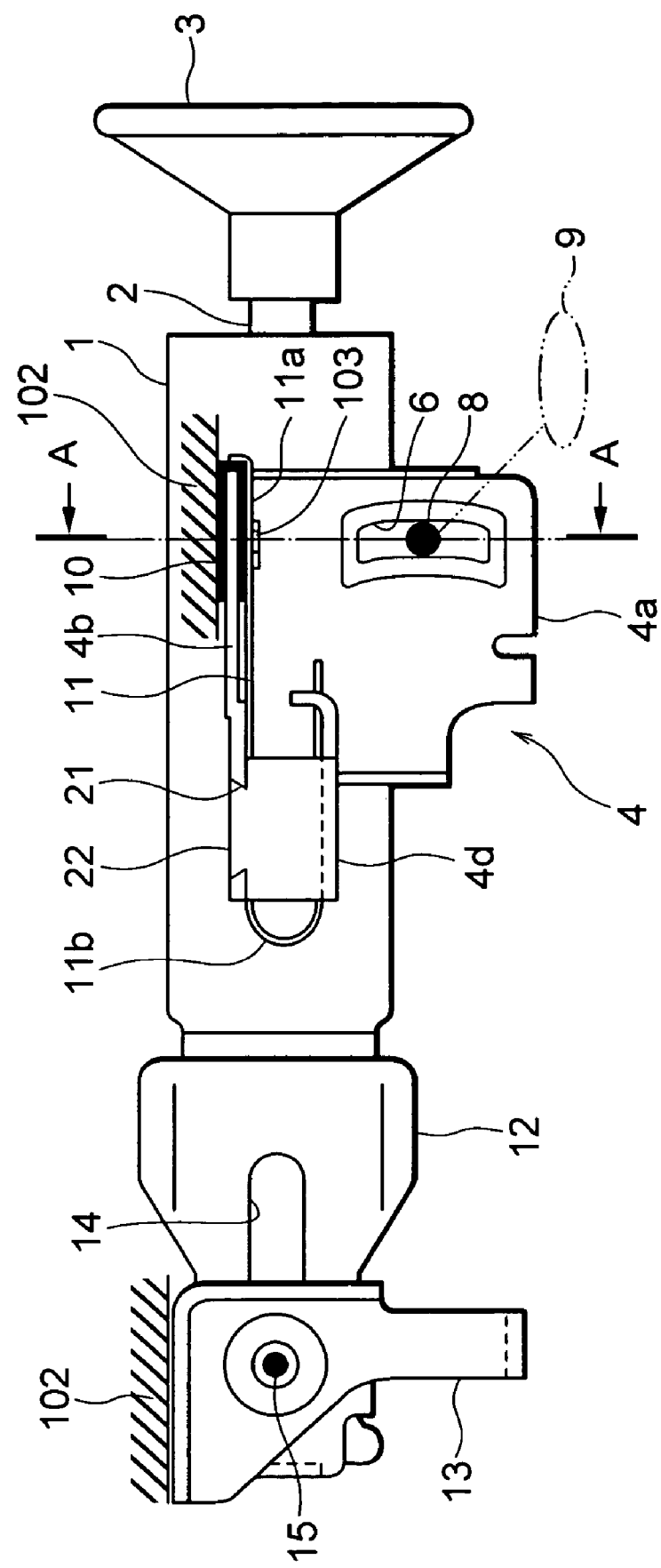
FIG. 1 is a side view of a shock absorbing steering column apparatus according to an embodiment of the present invention.
Figure 2:
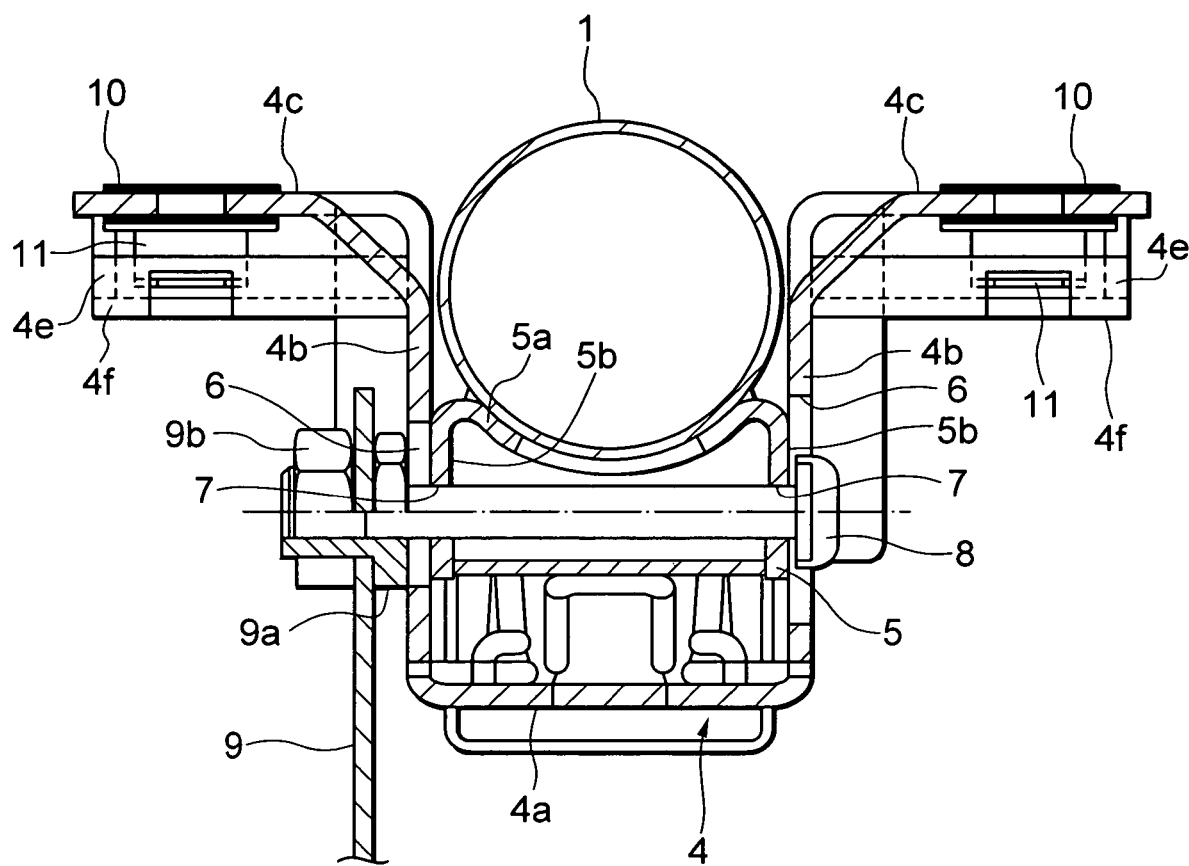
FIG. 2 is a cross-sectional view taken along the line A-A in FIG. 1.
Figure 3:
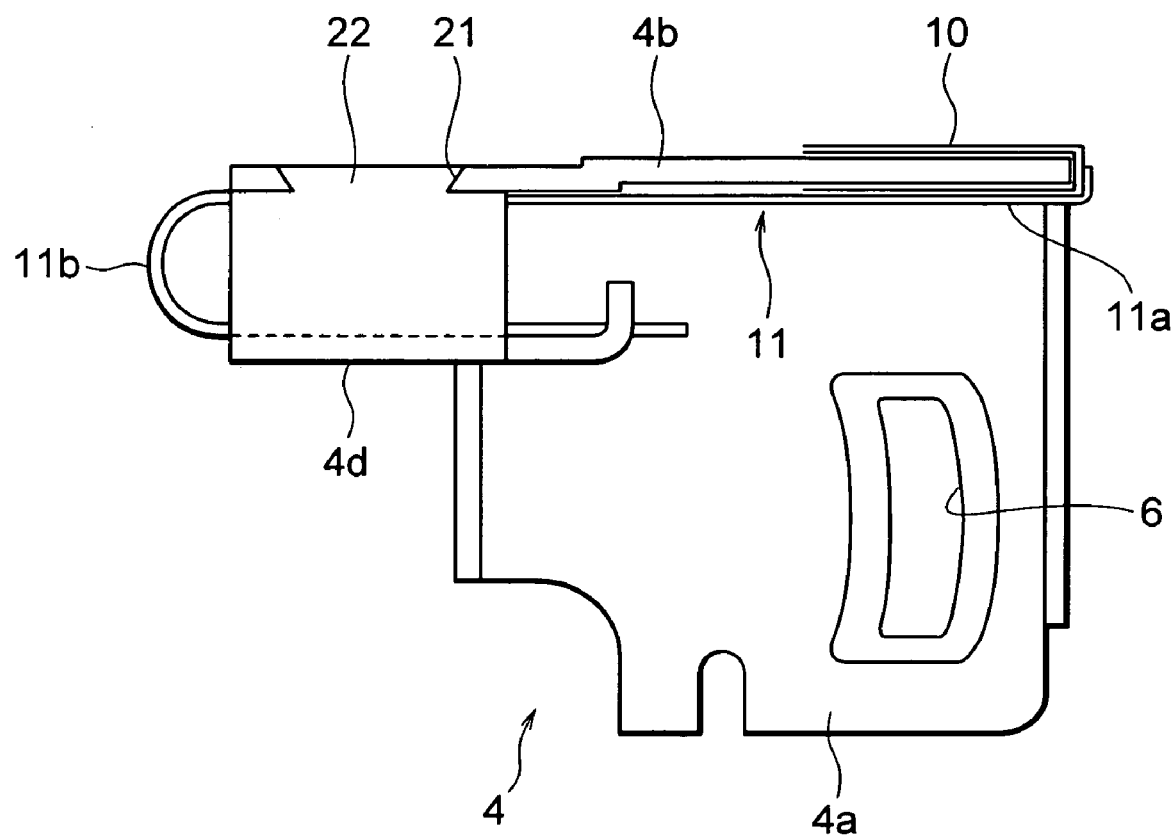
FIG. 3 is a side view of a body-side upper bracket.
Figure 4B:
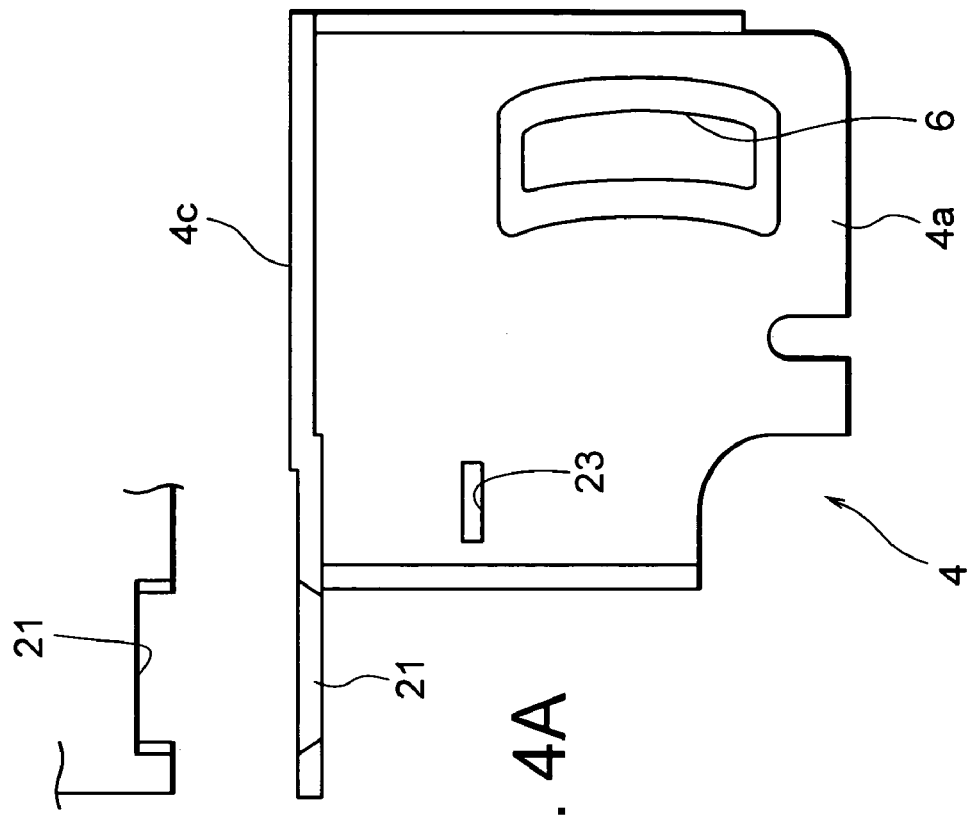
FIG. 4B is a plan view of a notch portion as a part of a flange of the body-side upper bracket.
Figure 4A:
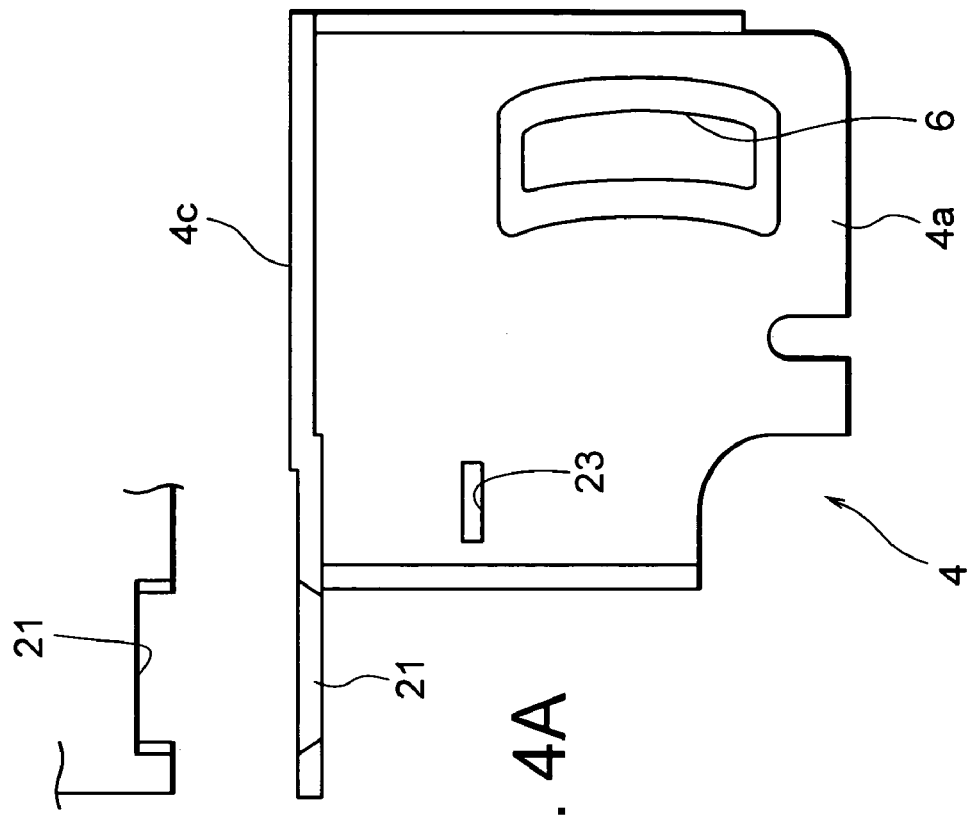
FIG. 4A is a side view of the main body of the body-side upper bracket.
Figure 4C:
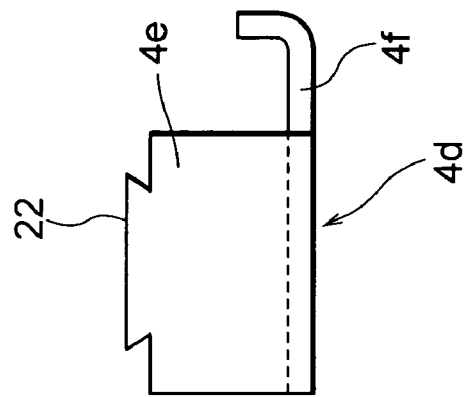
FIG. 4C is a side-view of a stand-out portion of the body-side upper bracket.
Figure 4D:
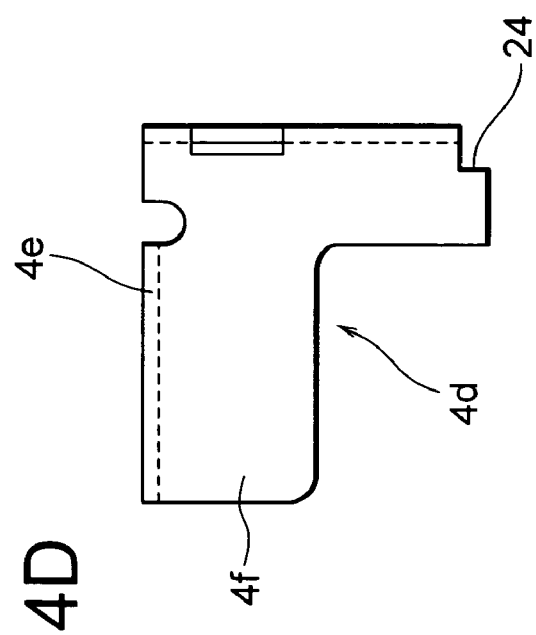
FIG. 4D is a bottom view of the stand-out portion of the body-side upper bracket.

FIG. 1 is a side view of a shock absorbing steering column apparatus according to a first embodiment of the present invention, FIG. 2 is a cross-sectional view taken along the line A-A in FIG. 1, and FIG. 3 is a side view of a body-side upper bracket. FIG. 4A is a side view of the main body of the body-side upper bracket, FIG. 4B is a plan view of a cut-away portion of a flange of the body-side upper bracket, FIG. 4C is a side-view of a stand-out portion of the body-side upper bracket, and FIG. 4D is a bottom view of the stand-out portion of the body-side upper bracket.

As shown in FIG. 1, a steering shaft 2 is rotatably supported on the steering column 1, and a steering wheel 3 is attached to the upper end of the steering shaft 2.

The steering column 1 is supported and secured to the car body at two portions, that is, an upper bracket in the rear part of the car and a lower bracket in the front part thereof.

The upper bracket in the rear part of the car is comprised of a body-side upper bracket 4 (tilt bracket) secured to the car body and a column-side upper bracket 5 (distance bracket in FIG. 2) secured to the steering column 1, and the both upper brackets 4 and 5 are brought into pressure contact with each other.

The body-side upper bracket 4 is comprised of a U-shaped main body portion 4a which is extended downward with the column 1 being located therein and flange portions 4c, 4c which are respectively extended outwardly from both side portions 4b, 4b of the main body portion 4a, and is secured to a structural member 102 of the car body at the flange portions 4c, 4c with bolts 103. The column-side upper bracket 5 is comprised of a column supporting portion 5a which is secured to a lower part of the column 1, both side portions which are extended downward from the column supporting portion 5a to be brought into pressure contact with the both side portions of the body-side upper bracket 4, and a bottom portion for coupling the both side portions together.

The both side portions 4b, 4b of the body-side upper bracket 4 are respectively provided with elongated holes 6, 6 for tilt adjustment. On the other hand, the both side portions 5b, 6b of the column-side upper bracket 5 are respectively provided with circular holes 7, 7 (FIG. 2). A tilt caulking bolt 8 is passed through the elongated holes 6, 6 for tilt adjustment and the circular holes 7, 7. A tilt operation lever 9 is attached to one end of the tilt caulking bolt 8 by a caulking nut 9b through an adjustment nut 9a. These members constitute a tilt lock mechanism. Note that elongated holes may be used instead of the circular holes 7, 7 in order to enable adjustment of a telescopic position of the steering column 1.

In addition, substantially U-shaped coating plates 10, 10 and shock absorbing plates 11, 11 for absorbing a shock energy at the secondary collision are secured to the car body with bolts 103 at the flanges 4c, 4c of the body-side upper bracket 4.

Each of the shock absorbing plates 11, 11 is secured to the car body by the use of the bolts 103 at the base end portion 11a thereof, and is extended to the front part of the car through the substantially U-shaped stand-out portion 4d of the body-side upper bracket 4. After being bent and folded back at an arcuate portion 11b, the shock absorbing plates 11, 11 are extended to the rear part of the car through the stand-out portion 4d.

At the secondary collision, the coating plate 10 is disconnected due to the shock energy directed toward the front part of the car, and the body-side upper bracket 4 is moved to the front part of the car together with the steering column 1.

On this occasion, while the shock absorbing plate 11 remains on the car body side since the base end portion 11a thereof is secured to the car body with the bolt 103, the arcuate portion 11b and the like are plastically deformed (drawn) inside the substantially U shaped stand-out portion 4b of the body-side upper bracket 4 which is moved to the front part of the car. It is possible to absorb the shock energy at the secondary collision due to this plastic deformation (drawing) of the shock absorbing plate 11. These members constitute a shock absorbing mechanism.

The lower bracket in the front part of the car is comprised of a column-side lower bracket 12 which is secured to the steering column 1 and a body-side lower bracket 13 which is brought into pressure contact with this column-side lower bracket 12 and is secured to the car body.

The column-side lower bracket 12 is formed with an axially elongated hole 14 which is extended in the axial direction, and a supporting pin 15 is passed through the axially elongated hole 14 of the column-side lower bracket 14 and the body-side lower bracket 12. This supporting pin 15 is caulked to be prevented to fall off. When the steering column 1 is arranged to be telescopically adjustable, the steering column is guided along this elongated hole 14.

As shown in FIG. 3 and FIGS. 4A to 4D, in the first embodiment, the body-side upper bracket 4 is constituted in advance by a plurality of divided components, including a main body component 4a and a stand-out portion 4d which is separately formed from the main body component as a different component. Upon assembling, these plurality of divided components (the main body 4a and the stand-out portion 4d) are connected together by caulking to constitute the body-side upper bracket 4.

More specifically, as shown in FIGS. 4A to 4D, the main body component 4a of the body-side upper bracket 4 integrally comprises both side portions 4b, 4b between which the steering column 1 is extended, a U-shaped portion integrally formed with a connection part for connecting the both side portions together, and flange portions 4c, 4c extending from the U-shaped portion toward the column side to be mounted on the car body. The flange portions 4c, 4c are provided with recesses 21, 21 in the front part of the car for caulking. The stand-out portion 4d as the separate component is integrally comprised of a side plate portion 4e which is disposed in parallel to the side portion 4b, in a state of being assembled in the main body component 4a as described later, and a bottom plate portion 4f which is extended between the side plate portion 4e and the side portion 4b. A projection 22 for caulking is formed in an upper part of the side plate portion 4e to be fitted in the caulking recesses 21, 21 of the flange portions 4c, 4c. The main body component 4a is formed with an insertion hole 23, and an insertion projection 24 is formed on the bottom plate portion 4f of the stand-out portion 4d to be corresponding thereto. The projection 22 for caulking of the stand-out portion 4d is brought into engagement with the caulking recess 21 while the insertion projection 24 with insertion hole 23 so that the main body component and the separate component are caulked and connected together, thereby constituting the body-side upper bracket 4.

As described above, according to the present embodiment, the body-side upper bracket 4 is not formed by bending one metallic plate, but by preparing in advance several divided components (the main body 4a and the stand-out portion 4d), and connecting these divided components to each other by caulking by the use of engagement portions which have been respectively processed. Thus, the processing can be easily performed, the number of bending operations and that of the processing steps can be reduced, and resultantly, the manufacturing cost can be reduced.

Since the upper bracket 4 is formed by the several divided components (main body 4a and the stand-out portion 4d), an area of each blank can be small, so that an waste fractional material can be reduced as small as possible.

Furthermore, since the caulking step is employed, no gas is produced during welding, so that there arises no adverse influence on the environment and deformation due to the heat generated in welding and other bad effect are not generated. As a result, the apparatus can be stably manufactured.

Further, for the welding step, it is required to manage welding conditions or to perform inspection for confirming the conditions. However, in the caulking step, it can be clearly judged whether the components have been caulked or not. As a result, a problem of non-connection which can not be judged apparently can be avoided.

Figure 5:
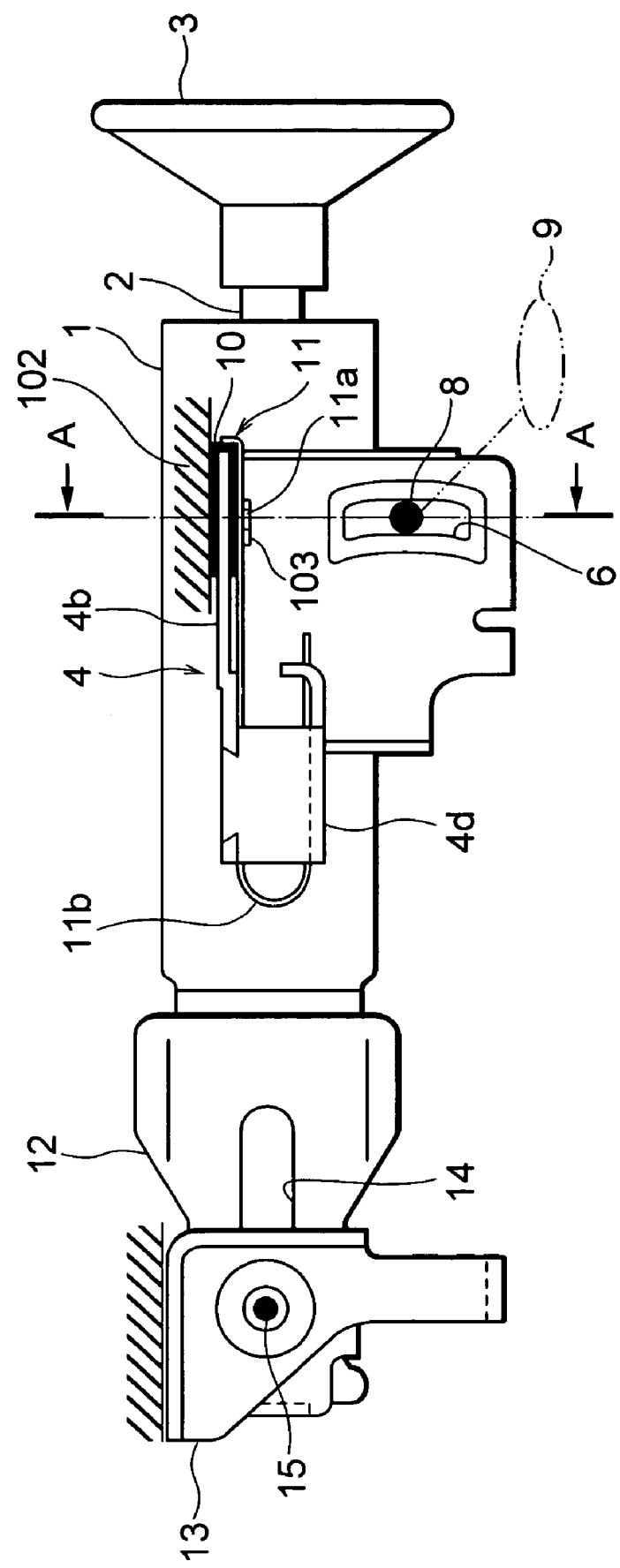
FIG. 5 is a side view of a shock absorbing steering apparatus of a tilt telescopic type according to a second embodiment of the present invention.

FIG. 5 is a side view of a shock absorbing steering apparatus of a tilt telescopic type according to a second embodiment of the present invention.

Figure 6:
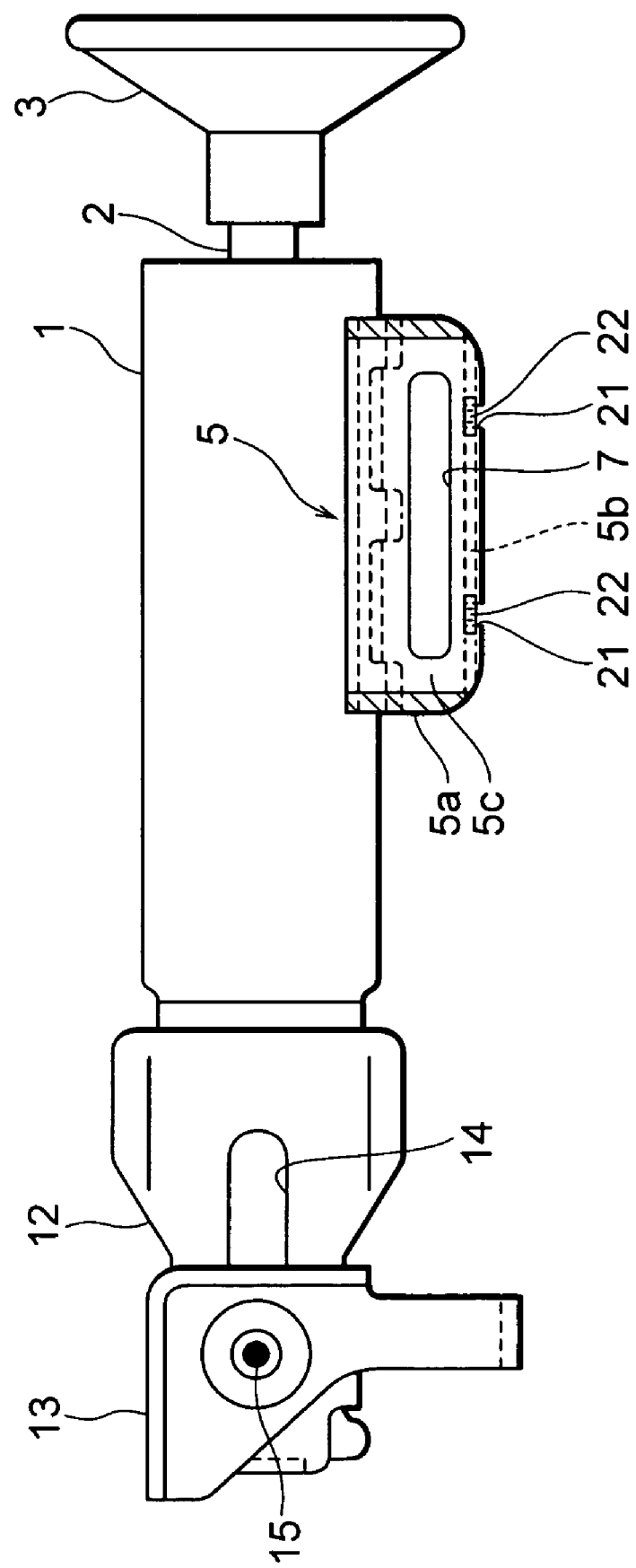
FIG. 6 is a side view showing a state in which the body-side upper bracket (tilt bracket) is disconnected from the steering column apparatus in FIG. 5.

FIG. 6 is a side view showing a state in which the body-side upper bracket (tilt bracket) is removed from the steering column apparatus in FIG. 5.

Figure 7:
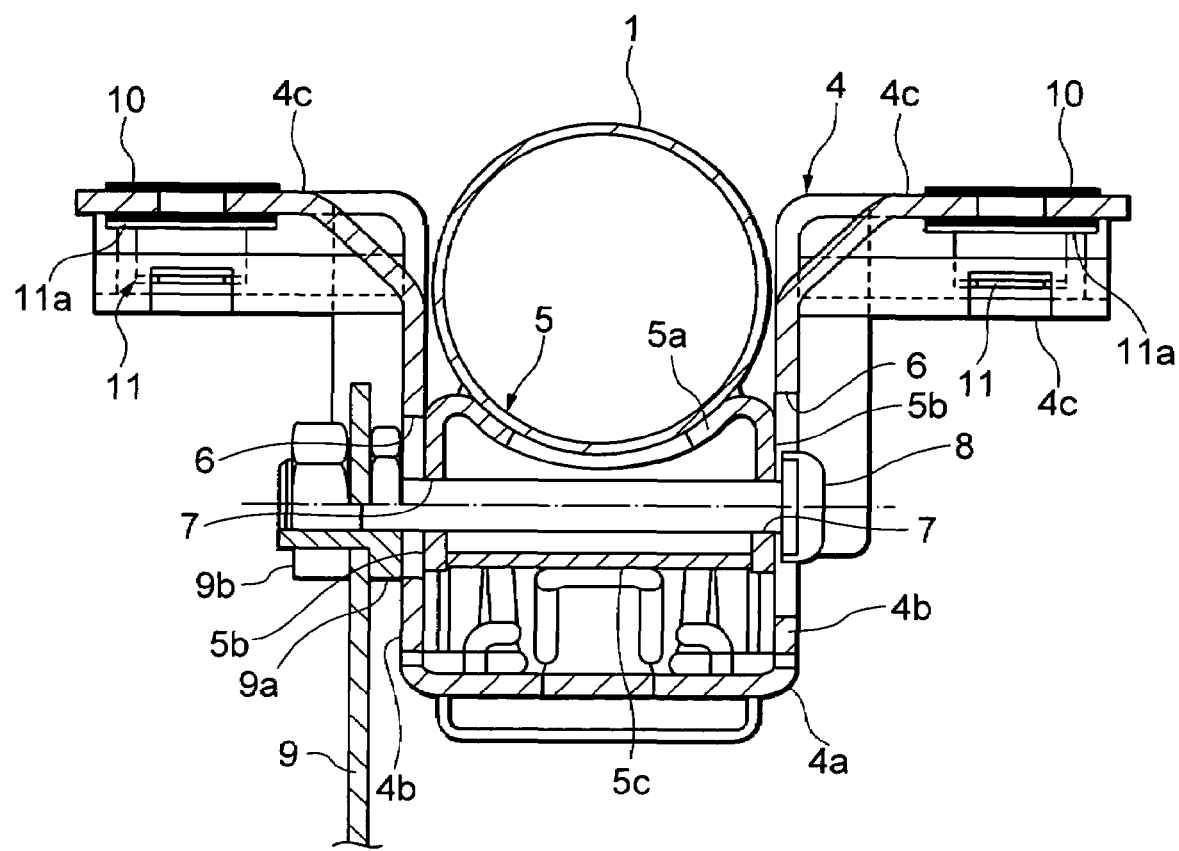
FIG. 7 is a cross-sectional view taken along the line A-A in FIG. 5.

FIG. 7 is a cross-sectional view taken along the line A-A in FIG. 5.

Figure 8:
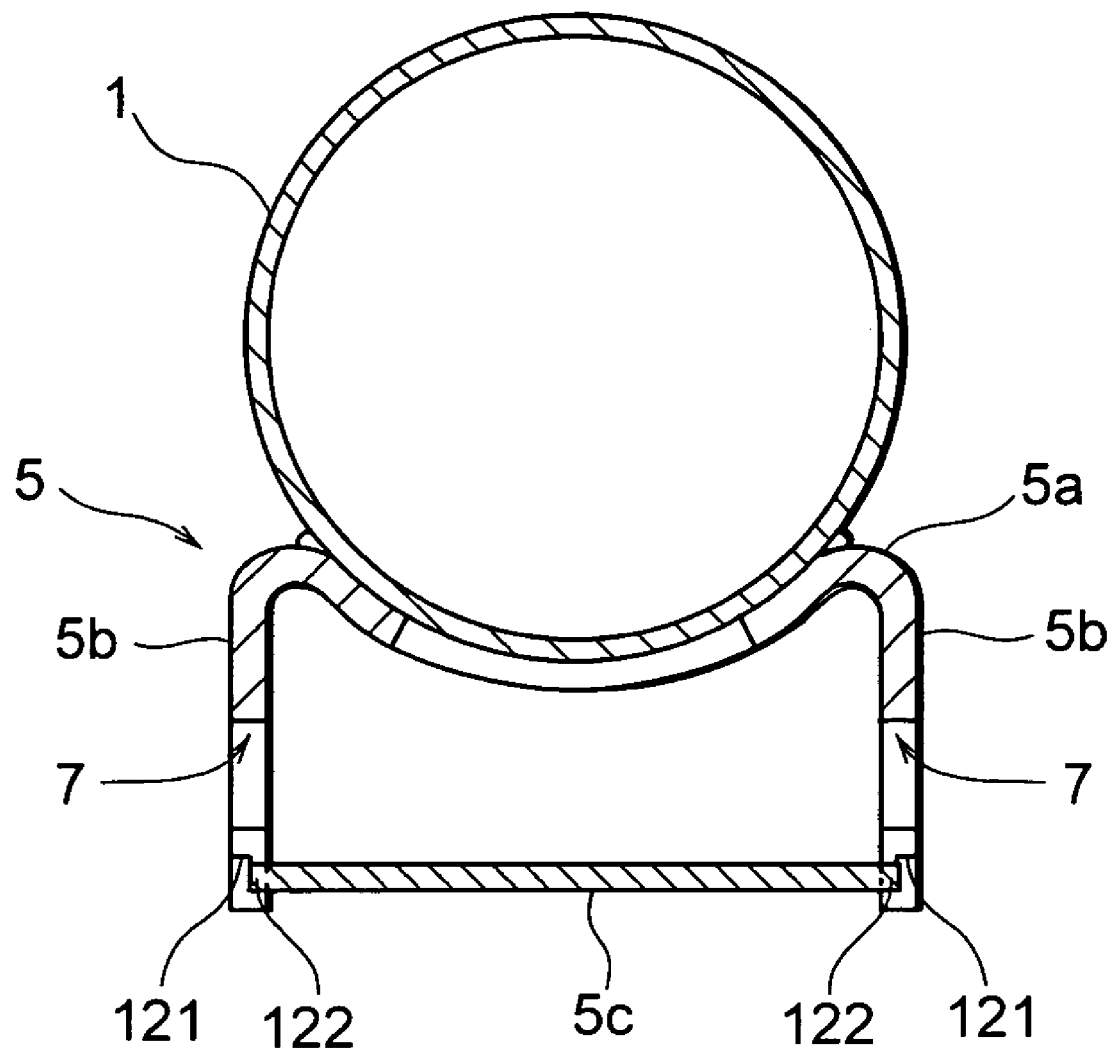
FIG. 8 is a cross-sectional view showing a state in which merely a steering column and a column-side upper bracket (distance bracket) are disconnected from the steering apparatus in FIG. 7.

FIG. 8 is a cross-sectional view showing a state in which only the steering column and the column-side upper bracket (distance bracket) are taken out of the steering apparatus in FIG. 7.

Figure 9A:
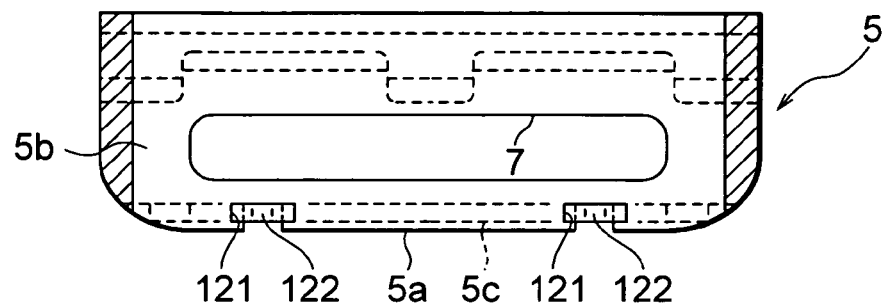
FIG. 9A is a side view of the column-side upper bracket.
Figure 9B:
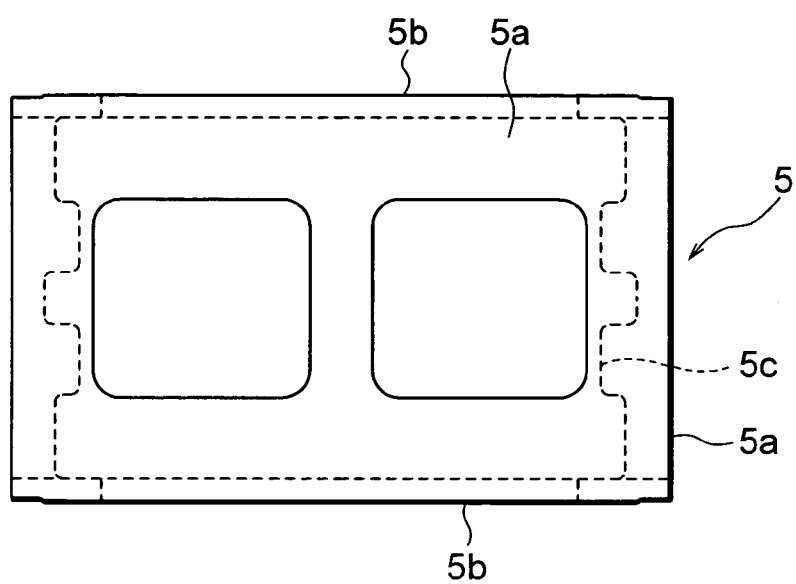
FIG. 9B is a plan view of a flange of the column-side upper bracket.
Figure 9C:
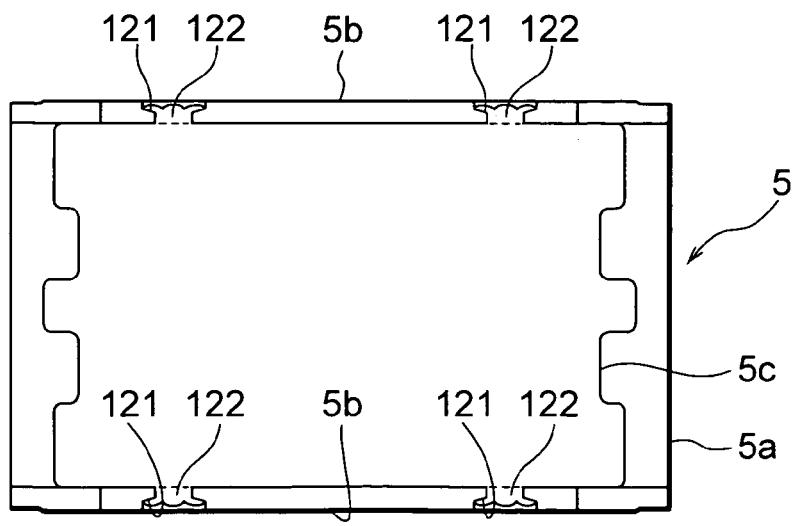
FIG. 9C is a bottom view of the column-side upper bracket.

FIG. 9A is a side view of the column-side upper bracket, FIG. 9B is a plan view of a flange of the column-side upper bracket, and FIG. 9C is a bottom view of the column-side upper bracket.

Figure 10A:
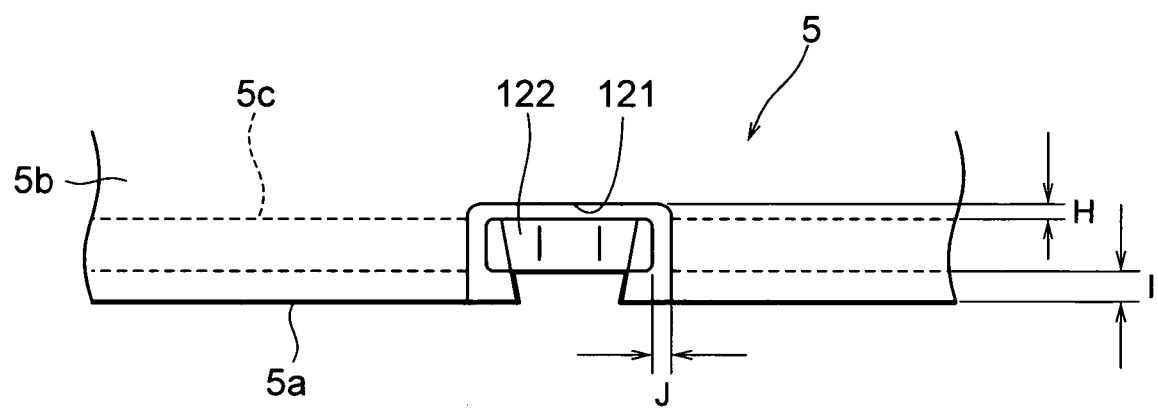
FIG. 10A is a partially enlarged side view of the column-side upper bracket.
Figure 10B:
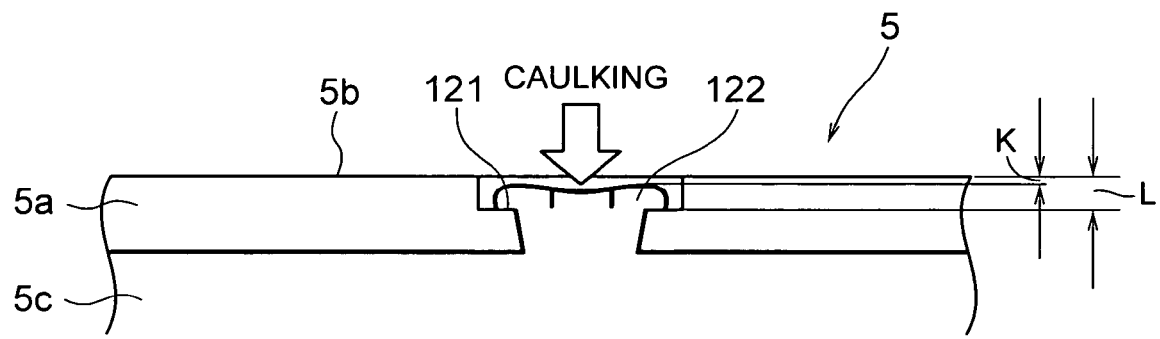
FIG. 10B is a partially enlarged bottom view of the column-side upper bracket.

FIG. 10A is a partially enlarged side view of the column-side upper bracket, and FIG. 10B is a partially enlarged bottom view of the column-side upper bracket.

As shown in FIG. 5, the steering shaft 2 is supported to be rotatable by the steering column 1, and the steering wheel 3 is attached to an upper end of the steering shaft 2.

The steering column 1 is supported and secured to the car body at two portions, that is, the upper bracket in the rear part of the car and the lower bracket in the front part thereof.

The upper bracket in the rear part of the car is comprised of the body-side upper bracket 4 (tilt bracket) secured to the car body and the column-side upper bracket 5 (distance bracket in FIG. 6) secured to the steering column 1, and the both upper brackets 4 and 5 are brought into pressure contact with each other.

The body-side upper bracket 4 is comprised of a U-shaped body portion 4a which is extended downward with a column 1 being located therein and flange portions 4c, 4c which are extended outwardly from the side plate portions 4b, 4b, and is secured to a structural member 102 of the car body at the flange portions 4c, 4c with bolts 103.

The column-side upper bracket 5 is comprised of a column supporting portion 5a which is in direct contact with a lower part of the column 1 and is secured to this lower part, both side plate portions 5b, 5b which are extended downward from the column supporting portion 5a to be brought into pressure contact with the inner surfaces of the both side plate portions 4b, 4b of the body-side upper bracket 4, and a bottom portion 5c for coupling the both side plate portions together.

The both side plate portions 4b, 4b of the body-side upper bracket 4 are respectively formed with elongated holes 6, 6 for tilting adjustment. On the other hand, the both side plate portions 5*b*, 5*b* of the column-side upper bracket 5 are formed with elongated holes 7, 7 for telescopic adjustment (FIG. 6). A tilt caulking bolt 8 is passed through the elongated holes 6, 6 for tilt adjustment and the elongated holes 7, 7 for telescopic adjustment, and a tilt operation lever 9 is attached to one end of the tilt caulking bolt 8 by a caulking nut 9*a* through an adjustment nut 9*b*. These components constitute a clamp mechanism for tilt/telescopic adjustment.

In addition, substantially U-shaped coating plates 10, 10 and shock absorbing plates 11, 11 for absorbing a shock energy at a secondary collision are secured to the car body 102 with bolts 103 at the flanges 4*c*, 4*c* of the body-side upper bracket 4.

Each of the shock absorbing plates 11, 11 are secured to the car body by the use of the bolts 103 at the base end portions 11*a*, 11*a* thereof, and are extended to the front part of the car through the substantially U-shaped stand-out portion 4*d* of the body-side upper bracket 4. After being bent at an arcuate portion 11*b*, the shock absorbing plates 11, 11 are extended to the front part of the car through the stand-out portion 4*d*.

At the secondary collision, the coating plates 10, 10 are disconnected due to the shock energy which is directed toward the front part of the car, and the body-side upper bracket 4 is moved to the front part of the car, together with the steering column 1.

On this occasion, while the shock absorbing plates 11, 11 remain on the car body side since the base end portions 11*a*, 11*a* thereof are secured to the car body with the bolts 103, the arcuate portion 11*b* and the like are plastically deformed (drawn) inside the stand-out portion 4*b* in the substantially U shape of the body-side upper bracket 4 which is moved to the front part of the car. The shock energy at the secondary collision can be absorbed by this plastic deformation (drawing) of the shock absorbing plates 11, 11. These components constitute a shock absorbing mechanism.

The lower bracket in the front part of the car is comprised of a column-side lower bracket 12 which is secured to the steering column 1 and a body-side lower bracket 13 which is brought into pressure contact with this column-side lower bracket 12 and is secured to the car body.

The column-side lower bracket 12 is formed with an axially elongated hole 14 which is extended in the axial direction, and a supporting pin 15 is passed through the axially elongated hole 14 of the column-side lower bracket 12 and the body-side lower bracket 12. This supporting pin 15 is secured by caulking.

As shown in FIG. 8 and FIGS. 10A and 10B, in the present embodiment, the column-side upper bracket 5 is constituted by a plurality of divided components (including a main body portion 5*a* having a substantially M-shaped cross section for constituting a column supporting portion and a fit plate portion 5*c* for constituting the bottom portion). At assembling, these plurality of divided components (the main body portion 5*a* having a substantially M-shaped cross section and the fit plate portion 5*c*) are connected together by caulking to constitute the column-side upper bracket 5.

More specifically, as shown in FIGS. 9A to 9C, the column-side upper bracket 5 is comprised of the main body portion and the fit plate portion 5*c* which is formed separately from the main body portion. This main body portion comprises a column supporting portion 5*a* which is in direct contact with a lower part of the column 1 and is secured to this lower part, and both side plate portions 5*b*, 5*b* which are extended downward integrally with the column supporting portion 5*a* to be brought into pressure contact with the inner surfaces of the both side plate portions 4*b*, 4*b* of the body-side upper bracket 4. In the present embodiment, the bottom portion of the column-side upper bracket 5 is formed as the fit plate portion 5*c* which is separately formed from the main body portion.

As seen from FIGS. 9A to 9C, the lower ends of the both side plate portions 5*b*, 5*b* of the main body are provided with caulking recesses 121, 121, while the both ends of the fit plate 5*c* are provided with projections 122 for caulking. Note that there are formed four caulking portions 121, 122 in this case, but the number of the caulking portions is not limited to this, but may be increased or decreased if necessary. For example, if an amount of the telescopic adjustment is great, the column-side upper bracket 5 (distance bracket) is inevitably long, so that the number of the caulking portions 121, 122 thereof becomes accordingly great.

Also, in FIG. 10A, the caulking recesses 121 which are provided at the lower ends of the side plate portions 5*b*, 5*b* of the main body 5*a* are formed with cut-away portions each of which is in a reverse trapezoidal shape, so that the main body is not disconnected when the projection 122 of the fit plate 5*c* is caulked in. Further, there are provided spaces such as H and J so as to generate no problem even if the fit plate 5*c* is protruded after the caulking step. Still further, a space I is provided to make the disconnection more difficult.

Further, in FIG. 10B, a cross section of the column-side upper bracket 5 (distance bracket) is indented only by the depth of a space L. With this arrangement, a space K is set in such a manner that the tip end of the caulking projection 122 of the fit plate 5*c* is not projected from a frictional surface of the side plate portion 5*b* when being caulked. Further, the caulking projection 122 is formed to have a wider upper end so as not to drawn out after being caulked.

As described above, in the present embodiment, the column-side bracket 5 is constituted by a plurality of divided components (including a main body 5*a* having a substantially M-shaped cross section and a fit plate portion 5*c*). At assembling, these plurality of divided components (the main body 5*a* having a substantially M-shaped cross section and the fit plate 5*c*) are connected together by caulking to constitute the column-side bracket 5.

More specifically, the column-side bracket 5 is not formed by bending one metallic plate, but by preparing in advance the two divided components (the main body 5*a* having a substantially M-shaped cross section and the fit plate 5*c*), and connecting these divided components (the main body 5*a* having a substantially M-shaped cross section and the fit plate 5*c*) to each other by caulking in engagement portions which have been respectively processed. Thus, the processing can be easily performed, the number of bending operations and that of the processing steps can be reduced, and resultantly, the manufacturing cost can be reduced.

Since the two plates (the main body 5*a* having a substantially M-shaped cross section and the fit plate 5*c*) are used, when a contact pressure is applied from the clamp mechanism onto the outer surfaces (frictional surfaces) of the both side plate portions 5*b* of the main body of the column-side bracket 5, as shown in FIG. 8, they can be hardly flexible and the bending rigidity or retaining capacity can be made comparatively high.

Further, the bracket 5 is formed of the several divided components, an area of a blank can be small, so that an waste fractional material can be reduced to the minimum.

Since there arises no problem such as deformation caused by the welding heat, rust due to partial heat influence, dust and dirt including spatter and material flow, the column-side bracket 5 can be manufactured stably.

Further, since the caulking process is employed, no gas is produced which is produced when welding is performed, so that the environment can be protected.

Further, for the welding step, it is required to manage welding conditions or to perform inspection for confirming the conditions. However, in the caulking step, it can be clearly judged whether the components have been caulked or not. As a result, a problem of non-connection which can not be judged apparently can be avoided.

Note that the present invention is not limited to the above-described embodiments, but can be altered in a various manners.

As described in the two embodiments described above, according to the present invention, the body-side upper bracket or the column-side bracket is constituted by a plurality of divided components, and upon assembling, these plurality of divided components are connected together by caulking to constitute the body-side upper bracket or the column-side bracket.

More specifically, the body-side upper bracket or the column-side bracket is not formed by bending one metallic plate, but by preparing in advance the several divided components, and connecting these divided components to each other by caulking in engagement portions which have been respectively processed. Thus, the processing can be easily performed, the number of bending operations and that of the processing steps can be reduced, and resultantly, the manufacturing cost can be reduced.

Since a plurality of plates are used, when a contact pressure is applied from the clamp mechanism onto the outer surfaces (frictional surfaces) of the body-side upper bracket or the column-side bracket, they can be hardly flexible and the bending rigidity or retaining capacity can be made comparatively high.

Further, the body-side upper bracket or the column-side bracket is formed of the several divided components, an area of a blank can be small, so that an waste fractional material can be reduced to the minimum.

Since there arises no problem such as deformation caused by the welding heat, rust due to partial heat influence, dust and dirt including spatter and material flow, the body-side upper bracket or the column-side bracket can be manufactured stably.

Further, since the caulking process is employed, no gas is produced which is produced when welding is performed, so that the environment can be protected.

Further, for the welding step, it is required to manage welding conditions or to perform inspection for confirming the conditions. However, in the caulking step, it can be clearly judged whether the components have been caulked or not. As a result, a problem of non-connection which can not be judged apparently can be avoided.

What is claimed is:

1. A manufacturing method of a steering column apparatus for a vehicle in which a steering column is supported and secured on the vehicle body through a bracket, said method comprising:

forming said bracket in advance, said bracket including a plurality of individual components connected by caulking via caulking projections and caulking recesses thereof, wherein said individual components include:

a U-shaped main body component which integrally comprises two side portions each having an insertion hole and extended in parallel to an axis of said steering column, a connecting portion connecting said side portions, and flange portions to be attached to the vehicle body, the flange portions having said caulking recesses and extending, respectively, along sides of said steering column from said side portions, and two separate components respectively having integrally first plate portions to be opposed to said flange portions of the main body component and provided with insertion projections to be connected to said respective insertion holes and second plate portions to be opposed to said side portions of the main body component and provided with said caulking projections to be connected to said respective caulking recesses;

wherein said forming includes connecting said insertion holes of said side portions and said insertion projections of said first plate portions respectively to each other, and connecting said caulking recesses of said flange portions and said caulking projections of said second plate portions to each other; and disposing shock absorbing plate members respectively between said side portions of the main body component and said two separate components, an end of each shock absorbing plate member being secured to the vehicle body and extended along said side portions of the main body component and then bent and folded back along said first plate portions of said separate components.

2. A manufacturing method of a steering column apparatus for a vehicle in which a column-side bracket attached to a steering column is brought into pressure contact with a body-side bracket attached to the body of the vehicle, said method comprising:

providing a plurality of individual components of said column-side bracket including a main body component having a column supporting portion and two side plate portions integrally formed with said column supporting portion, the side plate portions of said main body component each being formed at an end thereof with a caulking recess, said individual components further including a fit plate component having ends each formed with a caulking projection to be engaged with a corresponding one of said caulking recesses for coupling said side plate portions of said main body component to each other;

assembling said individual components, said assembling including connecting said caulking recesses of said main body component and said caulking projections of said fit plate component to each other by caulking; and disposing said column-side bracket with said column supporting portion in direct contact with and secured to a lower part of the steering column, and with said two side plate portions respectively in pressure contact with inner surfaces of two side plate portions of said body-side bracket.

3. A steering column apparatus for a vehicle comprising a body-side bracket attached to the body of the vehicle for retaining a column-side bracket attached to the steering column by bringing the column-side bracket into pressure contact with two side plate portions of said body-side bracket extending in parallel to an axis of the steering column with the steering column passing therebetween, characterized in that:

said column-side bracket is comprised of individual components including a main body component having a column supporting portion directly in contact with and secured to a lower part of the steering column and two side plate portions integrally formed with said column supporting portion and respectively in pressure contact with inner surfaces of said side plate portions of said body-side bracket, the side plate portions of said main body component each being formed at an end thereof with a caulking recess, said individual components further including a fit plate component having ends each formed with a caulking projection to be engaged with a corresponding one of said caulking recesses for coupling said side plate portions of said main body component to each other; and said caulking recesses of said main body component and said caulking projections of said fit plate component are respectively connected to each other by caulking.

* * * * *